(12) United States Patent
Fukuoka et al.

(10) Patent No.: US 7,629,827 B2
(45) Date of Patent: Dec. 8, 2009

(54) SEMICONDUCTOR INTEGRATED CIRCUIT

(75) Inventors: Tetsuya Fukuoka, Ome (JP); Shigeru Nakahara, Higashiyamato (JP); Minoru Motoyoshi, Ome (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/167,236

(22) Filed: Jul. 2, 2008

(65) Prior Publication Data

US 2009/0072877 A1    Mar. 19, 2009

(30) Foreign Application Priority Data

Sep. 18, 2007    (JP) .............................. 2007-240402

(51) Int. Cl.
  *G06F 1/04* (2006.01)
(52) U.S. Cl. ..................... 327/295; 327/297; 327/161
(58) Field of Classification Search ......... 327/291–293, 327/295, 297, 155, 156, 158, 161, 564, 565
  See application file for complete search history.

(56) References Cited

U.S. PATENT DOCUMENTS 6,995,554 B2 * 2/2006 Loke et al. ............... 324/76.54
7,102,408 B2 * 9/2006 Yamaguchi ................. 327/293
7,272,743 B2 * 9/2007 Oikawa ...................... 713/503

FOREIGN PATENT DOCUMENTS

JP      04-076610 A    3/1992

OTHER PUBLICATIONS

Nobuyuki Nishiguchi "a challenge to the process Friendly design in a system LSI", Jul. 7, 2006, Semiconductor Technology Academic Research Center, p. 20 "OCV reduction by using physical properties".

* cited by examiner

*Primary Examiner*—An T Luu
(74) *Attorney, Agent, or Firm*—Miles & Stockbridge P.C.

(57) ABSTRACT

The semiconductor integrated circuit includes a first subordinate clock tree 802 and a second subordinate clock tree 803, wherein a clock is delayed by a variable delay circuit 805 and inputted into the second subordinate clock tree 803 so that the phases are matched each other of the output clocks from the end clock drivers with the same position in respective trees, thereby reducing clock skew.

17 Claims, 13 Drawing Sheets

CLOCK SKEW IN EACH SUBORDINATE
CLOCK TREE = CLOCK SKEW ON A CHIP

→ DELAY

SEMICONDUCTOR INTEGRATED CIRCUIT

CLAIM OF PRIORITY

The present application claims priority from Japanese patent application JP 2007-240402 filed on Sep. 18, 2007, the content of which is hereby incorporated by reference into this application.

FIELD OF THE INVENTION

The present invention relates to a semiconductor integrated circuit, and especially to a delay time control circuit for a clock signal.

BACKGROUND OF THE INVENTION

In a large-scale integrated circuit (LSI) including a sequential circuit which operates in synchronization with a clock signal, the difference between two clock signals of different locations in the LSI (hereinafter called a clock skew) is one of the factors which reduce the operating frequency of the LSI directly. With the improvement in the speed of LSI, the ratio of the clock skew to one machine cycle is becoming large and the clock skew control and reduction are indispensable in order to achieve a high-speed operation of LSI. It is becoming impossible, therefore, to disregard a clock skew due to variations in the manufacturing process of a semiconductor chip (On-chip variation, OCV) with the advancement in miniaturization of devices and enlargement of a wafer diameter in semiconductor technology in recent years.

Occurrence of OCV in LSI is described in a non-patent reference by Nobuyuki Nishiguchi "a challenge to the process FRIENDLY design in a system LSI" [online], Jul. 7, 2006, Semiconductor Technology Academic Research Center, Inc., [Mar. 30, 2007 search]—Internet <URL: http://www.starc.jp/download/forum2006/03-nishiguchi.pdf>. As shown in Slide 20 of this reference, there are two components of OCV, one is a random component produced at random within a chip, the other a systematic component having a spatial correlation within a chip, and these components are combined and observed as an on-chip variation.

Figure 2:
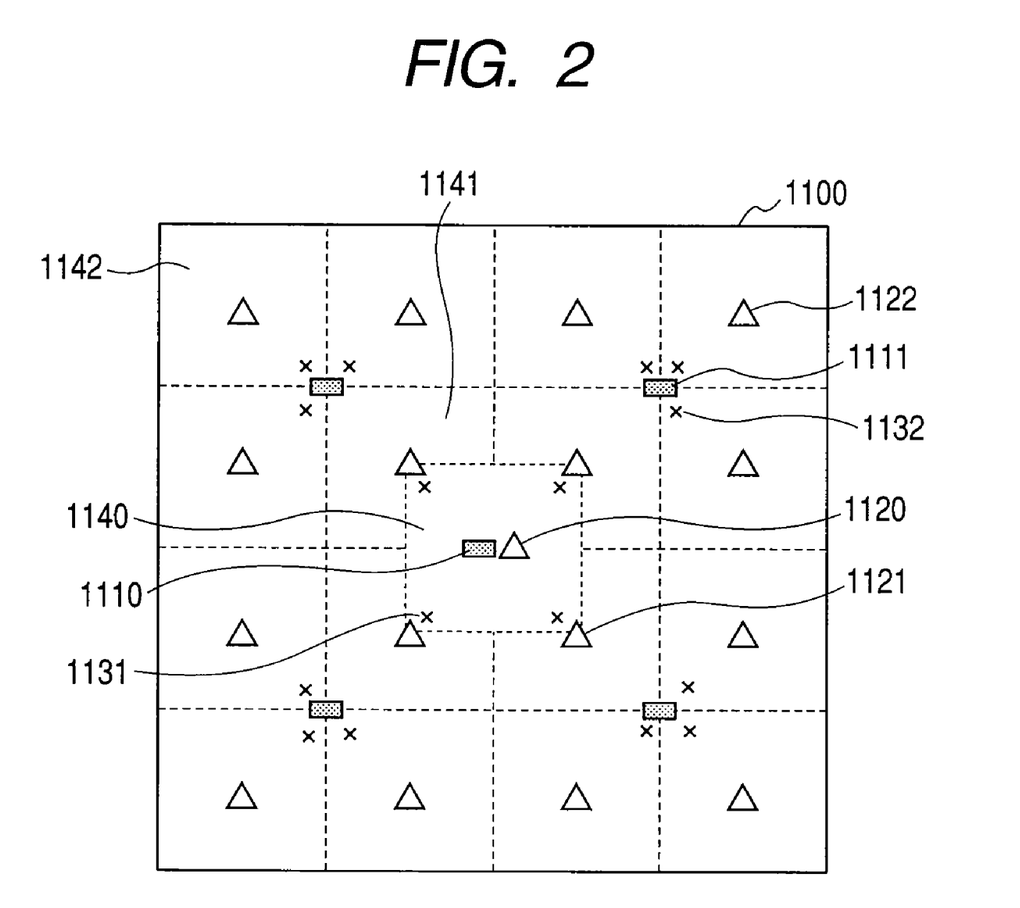
FIG. 2 a drawing illustrating the clock skew adjustment method disclosed in JP-A-Hei4(1992)-076610.

A conventional technology is disclosed in JP-A-Hei4 (1992)-076610, of distributing clocks taking into account of the characteristics variation in a chip. FIG. 2 shows a clock skew adjustment method disclosed in JP-A-Hei4(1992)-076610. In FIG. 2 an LSI chip 1100 is divided into three clock supplying regions, 1140, 1141, and 1142 and the clock phases near boundaries are compared by a phase comparator 1131 disposed near the boundary of the regions, and the phases are matched by variable delay circuits 1110 and 1120 arranged upstream in the clock tree scheme. Then, on the basis of the clock of the region 1141 thus matched as a reference, the clock of the non-adjusted region 1142 adjacent to the region 1141 is compared with the reference by a phase comparator 1132 and adjusted by a variable delay circuit 1122.

SUMMARY OF THE INVENTION

Figure 3:
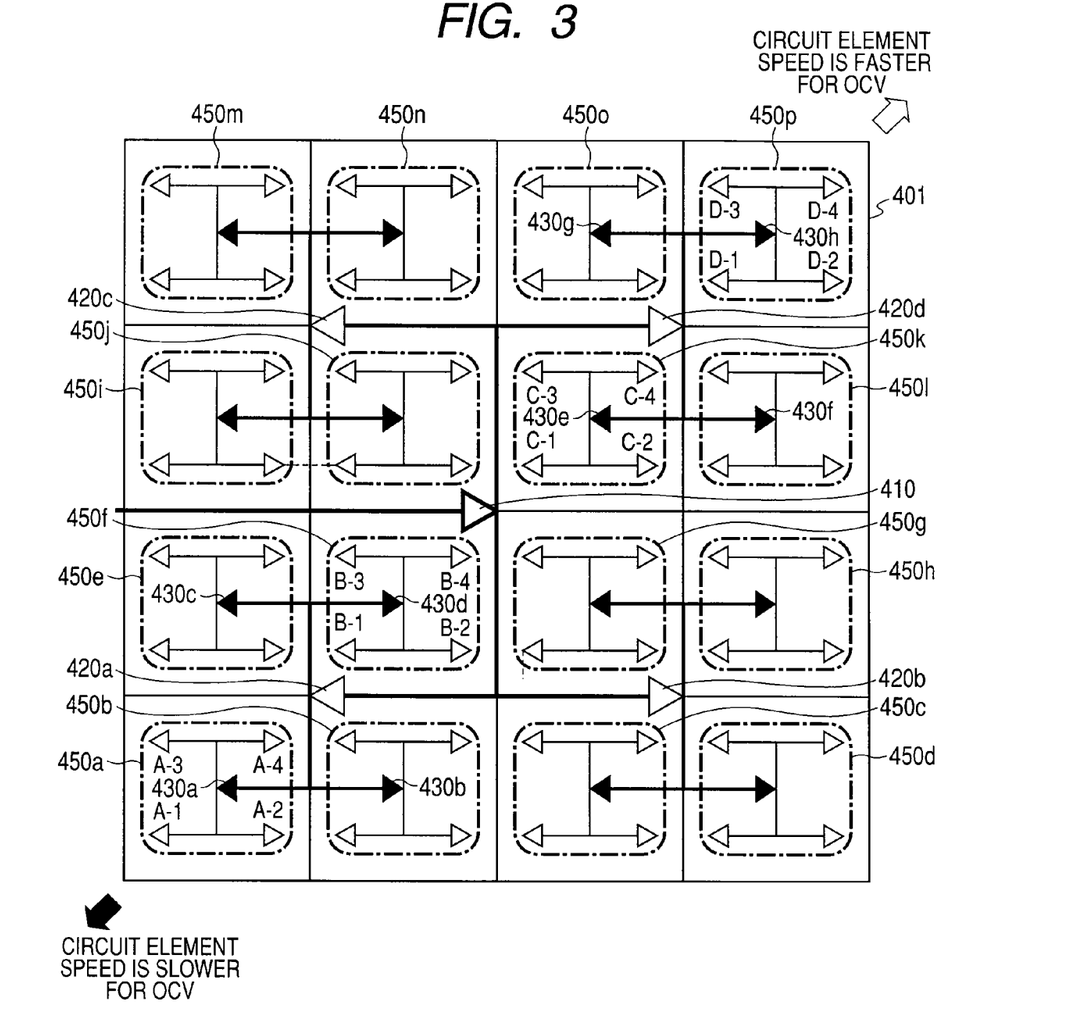
FIG. 3 shows the composition of H tree clock.
Figure 4:
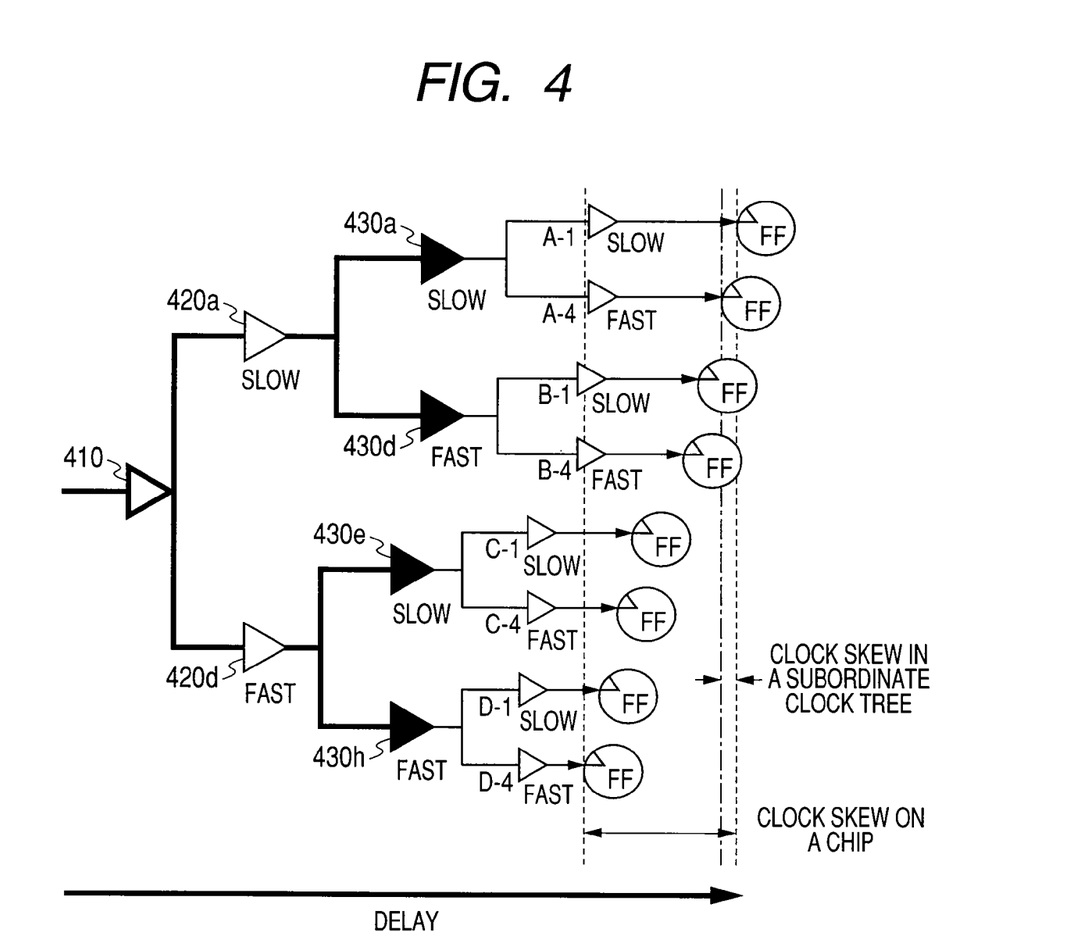
FIG. 4 shows an example of generation of the clock skew in the conventional clock distribution circuit.

The present inventor investigated an H-tree clock distribution (hereafter called the H tree clock) prior to the present application. The H tree clock formed in a semiconductor chip 401 is shown in FIG. 3. In the semiconductor chip 401, a systematic OCV component exists such that a circuit element speed becomes faster uniformly as the element goes to the upper right from the lower left in the chip. Wherever the H tree clock branches, a clock path branches and a lower layer clock tree (hereafter called a subordinate clock tree) distributes a clock to each of the divided regions. In an example of FIG. 3, a first level clock driver 410 branches to four second level clock drivers 420a-d, and also the second level clock driver 420a branches to four third level clock drivers 430a-d. Here taking notice of a subordinate clock tree 450 starting from the third level clock driver 430, a state of clock skew generation is shown in FIG. 4 in 16 subordinate clock trees 450a-p contained in the semiconductor chip 401.

Since the H tree clock is started from one point of a chip and distributed over the entire chip to every circuit element through long distance wiring, the random components of OCV are canceled during transmission and the systematic component of OCV mainly generates the clock skew in a subordinate clock tree and the clock skew in the chip arising from the delay time difference between the clock drivers of a higher level than a subordinate clock tree. The skew in a subordinate clock tree is a time variation in arrival time of the clock supplied by the subordinate clock tree at a flip-flop (FF). On the other hand, the clock skew in the chip arises from the delay time difference in the path supplied from the clock drivers 420d-430h-end clock driver D-4, and the path supplied from the clock drivers 420a-430a-end clock driver A-1, and has a larger value than the clock skew in a subordinate clock tree.

Thus, if a large clock skew is generated in the chip arising from the systematic component of OCV, for example, in an LSI operating at 1 GHz supposing there is no OCV, if an amount of variations is assumed to be 20% (±10%) and a delay of the clock after branching is 1 ns, then the clock at an end will have the variation of 200 ps (±100 ps) when calculated most simply. For this reason, the operating frequency of an actual LSI will fall to 1/1.1 ns=910 MHz resulting in decrease in the operating speed by 10%. On the contrary, in order to guarantee the operating frequency of 1 GHz for an actual LSI not only a design at a higher speed is required (1.1 GHz operation in the above example) to compensate frequency degradation by the clock skew, but also necessary to take measures for a hold violation in the circuit by the clock skew, so that the design convergence takes time and design productivity is reduced.

Although a characteristics variation in a chip is one of the subjects discussed in JP-A-Hei4(1992)-076610, the variation in the divided region in clock skew generated by a uniform OCV (systematic component) in the LSI as shown in the non-patent reference by Nobuyuki Nishiguchi ["a challenge to the process FRIENDLY design in a system LSI" [online], Jul. 7, 2006, Semiconductor Technology Academic Research Center, Inc.] is not taken into consideration and impossible to adjust this variation.

The present invention is made with attention to such a background, and the object of the invention is to provide a suitable regulation circuit and method especially for reducing the clock skew generated by the OCV (systematic component).

An example of the typical embodiments according to the present invention is described as follows. A semiconductor integrated circuit has a clock distributing circuit containing a plurality of subordinate clock trees. The semiconductor integrated circuit includes a first subordinate clock tree, a second subordinate clock tree, a reference clock, a phase-locked loop (PLL) for comparing the reference clock with the output clock of the first end clock driver contained in the first subordinate clock tree, a first phase comparator for comparing the output clock of the first end clock driver with the output clock of the second end clock driver contained in the second subordinate clock tree, and first variable delay circuits provided for corresponding to the second subordinate clock tree, in which a phase adjusted clock by the phase-locked loop is inputted to the clock distributing circuit and a delayed clock by the first variable delay circuits is inputted to the second subordinate clock tree, and the amount of delay of the first variable delay circuits is controlled by the first phase comparator so that the phase of the output clock of the first end clock driver is equal to the phase of the output clock of the second end clock driver, and the relative position of the second end clock driver in the end clock driver of the second subordinate clock tree is equal to the relative position of the first end clock driver in the end clock driver of the first subordinate clock tree.

Alternatively, a semiconductor integrated circuit has a clock distributing circuit containing a plurality of subordinate clock trees. The semiconductor integrated circuit includes a first subordinate clock tree, a second subordinate clock tree, and a delay circuit provided for corresponding to the second subordinate clock tree, in which a clock delayed by a predetermined amount by the delay circuit is inputted to the second subordinate clock tree, the predetermined amount of delay is obtained so that the phase of the output clock of the first end clock driver contained in the first subordinate clock tree is equal to the phase of the output clock of the second end clock driver, and the relative position of the second end clock driver in the end clock driver of the second subordinate clock tree is equal to the relative position of the first end clock driver in the end clock driver of the first subordinate clock tree.

A clock skew, especially the clock skew generated in the chip arising from the systematic component of the OCV can be reduced.

DETAILED DESCRIPTION OF THE PREFERRED EMBODIMENTS

Hereafter, the embodiments in accordance with the present invention are described in detail with reference to the drawings. However, the present invention is not limited to the illustrated embodiments.

First Embodiment

Figure 1:
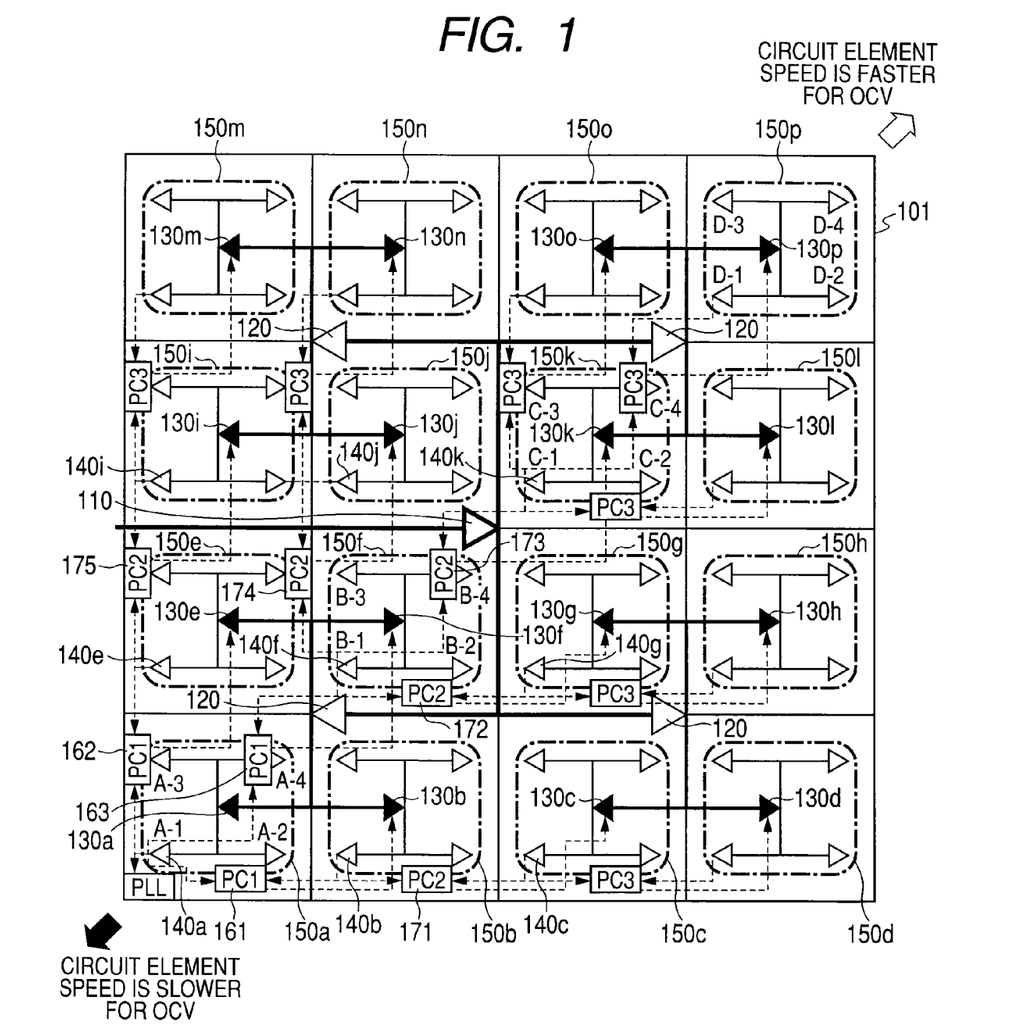
FIG. 1 shows the composition of the clock skew adjustment circuit of the semiconductor integrated circuit in accordance with the first embodiment of the present invention.

FIG. 1 shows the semiconductor integrated circuit of the first embodiment in accordance with the present invention. In the semiconductor chip 101 of this embodiment, a systematic OCV component is assumed to exist such that a circuit element speed becomes faster uniformly as the circuit element goes to the upper right from the lower left in the chip. Wherever an H tree clock branches, a clock distribution path branches and a lower layer clock tree (hereafter called a subordinate clock tree) distributes a clock to each of the divided regions. In the embodiment of FIG. 1, a first level clock driver 110 branches to four second level clock drivers 120, and also each of the second level clock drivers 120 branches to four third level clock drivers 130. The H tree clock of this embodiment is constituted so that the clock generated by the PLL with an end clock signal from the lower left in the semiconductor chip as a feedback clock is distributed over the entire chip to every circuit of the semiconductor chip, (in which the end clock signal is the one supplied from an end clock driver A-1 in the subordinate clock tree 150a in the example of FIG. 1).

The semiconductor integrated circuit of the first embodiment has a system in which the semiconductor chip is divided into 16 subordinate clock trees 150a-p of third level clock drivers 130 and the phases of clocks are adjusted among the subordinate clock trees 150 with each of the 150a-p as a unit Detailed explanations are described in the following.

A variable delay circuits with an up-down counter, the phase comparison result of the phase comparator mentioned later is inputted thereto as a control signal, is provided for each starting point clock driver 130 (the third level clock driver 130 in FIG. 1) of the subordinate clock tree 150. The phase comparators PC1, PC2, and PC3 are provided between adjacent subordinate clock trees, each for comparing the phases of the end clocks with the same relative position within respective subordinate clock trees as the feedback clock to the PLL between adjacent subordinate clock trees, and outputting the phase comparison result to the corresponding variable delay circuit with the up-down counter.

First, the subordinate clock tree 150a to output the feedback clock to the PLL is assumed to be a reference subordinate clock tree, and the feedback clock to the PLL to be a reference clock. The phase comparator PC1 compares the reference clock and the clock of the subordinate clock tree (hereafter called a compared subordinate clock tree) adjacent to the reference subordinate clock tree. Here, a clock inputted into the phase comparator PC 1 for comparison with the reference clock, i.e. a compared clock, is an outputted clock from an end driver having the same relative position within the compared subordinate clock tree as that of the end driver outputting the reference clock. This is because the influence of the OCV with a systematic component is taken into consideration. Here, the end clock driver with the same "relative position" is illustrated and explained. The subordinate clock 150a has the end clock drivers A-1 to 4. The end clock driver A-1 is positioned most in the lower left among those. Similarly, the subordinate clock 150f has the end clock drivers B-1-4. The end clock driver B-1 is positioned most in the lower left among those. Accordingly, the relative position of the end clock driver A-1 in the end clock drivers of subordinate clock tree 150a is regarded to be the same as the relative position of the end clock driver B-1 in the end clock drivers of subordinate clock tree 150f. Similarly, the relative positions of the end clock drivers A-1, 2, 3, and 4 in the end clock drivers of subordinate clock tree 150a are the same as the relative positions of the end clock drivers B-1, 2, 3, and 4 in the end clock drivers of subordinate clock tree 150f, respectively.

Further, "an end clock driver" means not a final level clock driver of a clock distributing circuit, but a clock driver of a specified level in the present application specification. For example, in a subordinate clock constituted from the subordinate clock trees 150a, b, e, and f (here called "extended subordinate clock"), "End" clock driver 130a has the same relative position as that the "end" clock driver 130k has in the extended subordinate clock constituted from the subordinate clock trees 150k, l, o, and p.

In this example, the subordinate clock driver 140a in the subordinate clock tree 150a is influenced by the systematic component of the OCV, and a circuit element speed becomes slower compared with those of other end drivers in the subordinate clock tree 150a. Similarly, the subordinate clock driver 140b in the subordinate clock tree 150b is influenced by the systematic component of the OCV, and a circuit element speed becomes slower compared with those of other end drivers in the subordinate clock tree 150b. Thus, by comparing end drivers having the same relative positions in each subordinate clock trees, end drivers having relatively the same characteristics can be compared within the subordinate clock tree, thereby enabling the influence of the systematic component of OCV to be made small. As for the phase comparator PC1, an arrangement is most preferable in which distances from both clock ends to the phase comparator are equal to one another and as short as possible in order to make the influence of a propagation delay small. The phase comparator 161 compares an output from the driver 140a which outputs a reference clock with a driver 140b output, the phase comparator 162 compares a driver 140a output with a driver 140e output, and the phase comparator 163 compares a driver 140a output with a driver 140f output. Thus, the phase comparator PC1 compares the phase of reference clock with the phase of a compared clock, the result of the phase comparison is inputted into a variable delay circuit in a compared subordinate clock tree, the amount of delay of the variable delay circuit is adjusted so that the phase of the reference clock matches to the phase of a compared clock in the phase comparator PC1. In the example of FIG. 1, the outputs of the phase comparators 161, 162, and 163 are inputted into the variable delay circuits of the clock drivers 130b, 130e, and 130f, respectively.

Next, the compared clock with the phase matched to that of the reference clock is assumed to be the reference clock for the next level, and the subordinate clock tree outputting a compared clock to be the reference clock of the next level is assumed to be a reference subordinate clock tree for the next level. A compared clock for the next level is assumed to be the clock with the same relative position within the subordinate clock tree (called the compared subordinate clock tree of the next level) adjacent to the reference subordinate clock tree of the next level as that of a reference clock. The reason for this is the same as the case where a phase comparison is made with a reference clock by the phase comparator PC 1. The phase comparator PC2 compares the phase of the reference clock of the next level with that of the compared clock of the next level. In the example of FIG. 1, the phase comparators 171, 172, 173, 174, and 175 compare the outputs from drivers 140b and 140c, the outputs from drivers 140f and 140g, the outputs from drivers 140f and 140k, the outputs from drivers 140f and 140j, and the outputs from drivers 140e and 140i, respectively. The phase comparison result of the phase comparator PC2 is inputted into the variable delay circuit in the compared subordinate clock tree of the next level and the amount of delay of a variable delay circuit is adjusted so that the phase of the reference clock of the next level matches to the phase of the compared clock of the next level in the phase comparator PC2. The outputs of the phase comparators 171, 172, 173, 174, and 175, are inputted into the variable delay circuits of the clock drivers 130c, 130g, 130k, 130j, and 130i, respectively.

Henceforth, the above-mentioned clock time delay adjusting operation is repeated with all the subordinate clock trees. That is, in the example of FIG. 1, subordinate clock trees 150c, 150g, 150k, and 150j are used as a reference subordinate clock tree for the next level, and all the other subordinate clock trees 150d, 150h, 150l, 150p, 150o, 150n and 150m are considered as compared subordinate clock trees for the next level, and the phase comparator PC3 is provided. Thereby, the phases of all 16 subordinate clock trees can be matched to the reference clock.

Figure 5:
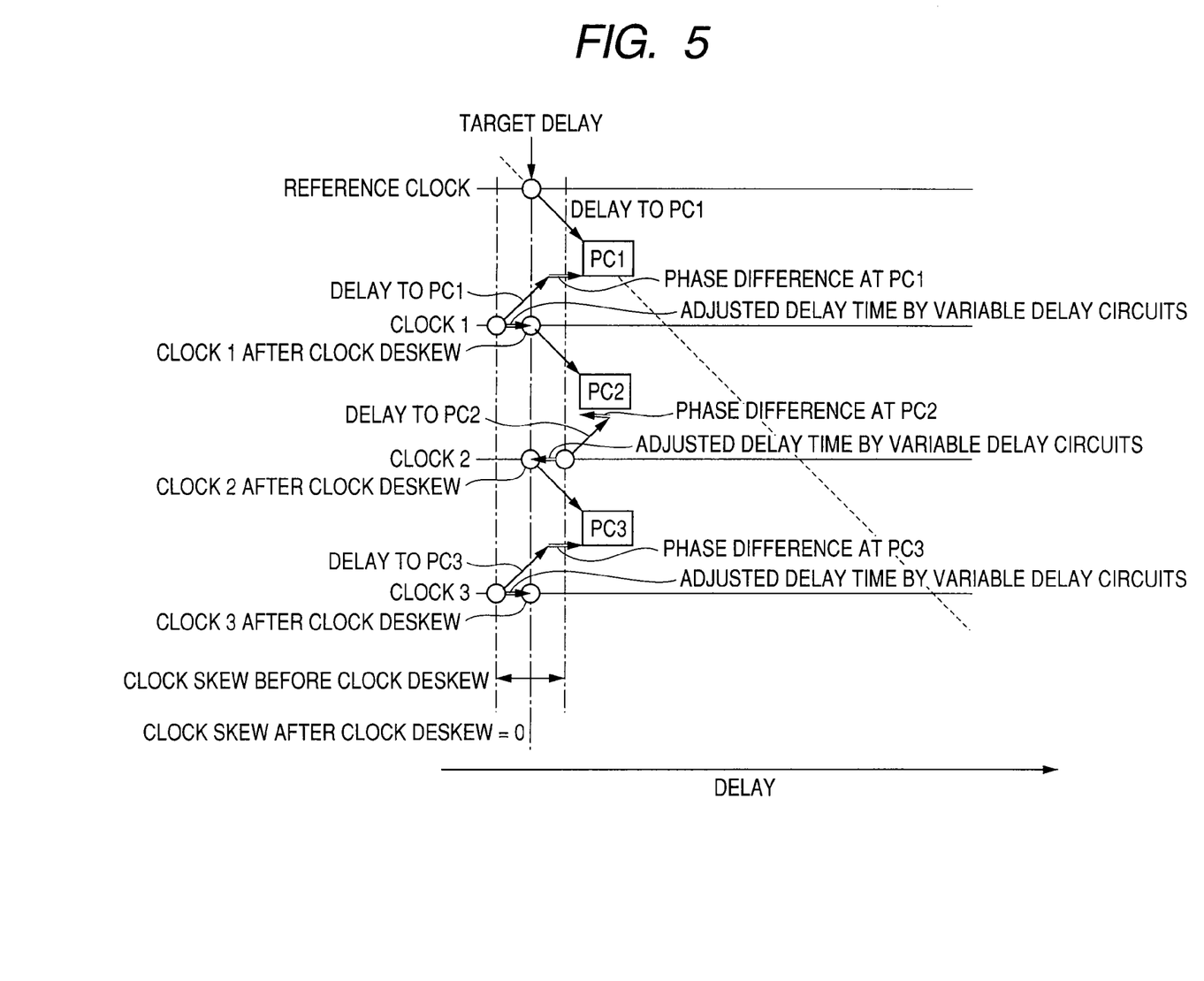
FIG. 5 is a drawing illustrating the principle of operation of a clock skew adjustment circuit in accordance with the first embodiment of the present invention.

The principle of clock skew control in the present invention is shown in FIG. 5. By arranging the phase comparator PC1 at an equal distance from the reference clock and the clock 1 as shown in FIG. 5, the wiring delay of the reference clock to the phase comparator PC1 and that of the clock 1 (corresponding to either one of the outputs from the end drivers 140b, 140e, or 140f in the example of FIG. 1) become equal. Therefore, by adjusting the amount of delay in the variable delay circuit of the clock 1 the phase matching between the reference clock and the clock 1 is achieved in the phase comparator PC1, and the clock 1 can be set to have the target delay on FIG. 2.

Next, by arranging the phase comparator PC2 at a position with an equal distance from the clock 1 which is a reference clock of the next level and the clock 2 (corresponding to one of the outputs from the end drivers 140c, 140g, 140k, 140j, and 140i in the example of FIG. 1), the wiring delays to the phase comparator PC2 become equal with the clock 1 and clock 2. Therefore, by adjusting the amount of delay in the variable delay circuit of the clock 2 the phase matching between the clock 1 and the clock 2 is achieved in the phase comparator PC2, and the clock 2 can be set to have the target delay. The phases of compared clocks can be matched with the reference clock by repeating adjusting operation for the clock time delays mentioned above.

Figure 6:
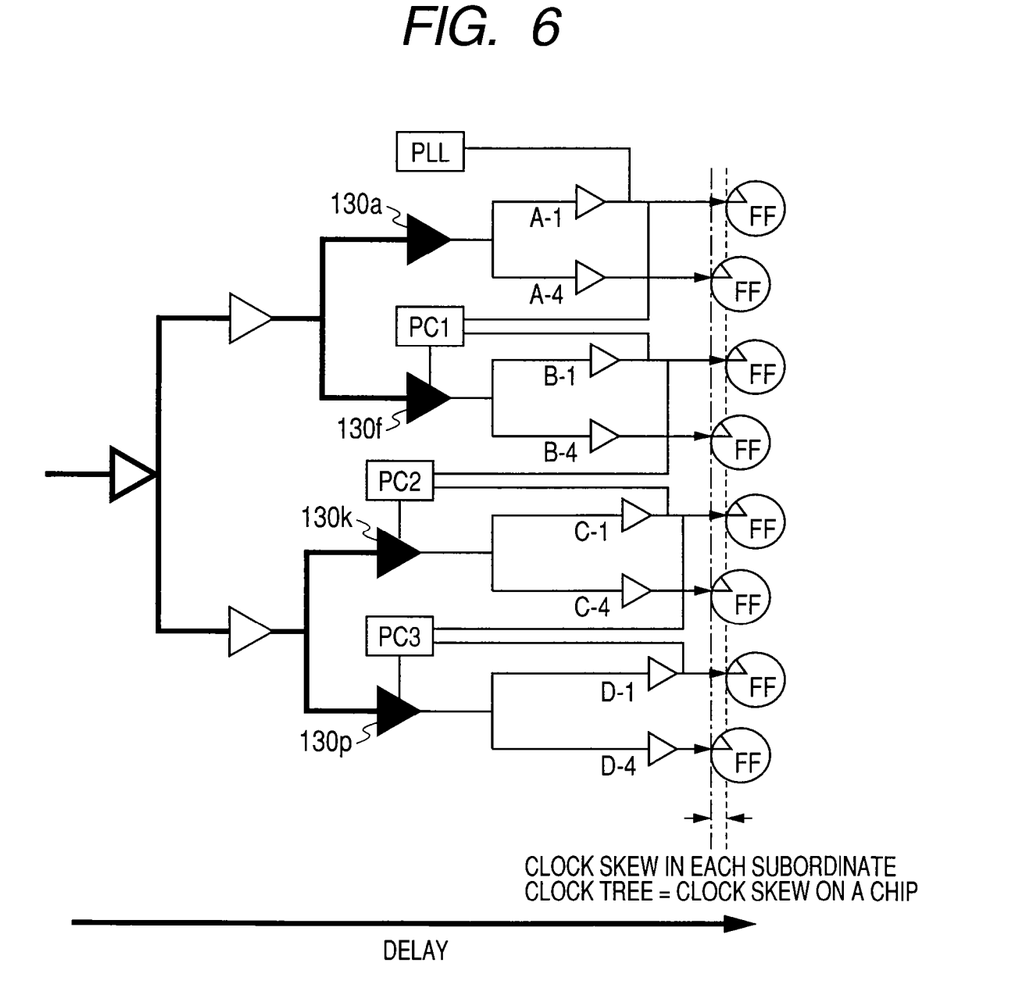
FIG. 6 shows an example of control of clock skew in accordance with the first embodiment of the present invention.

An example of clock skew control in accordance with one embodiment of the present invention is shown in FIG. 6. Since a clock skew between subordinate clock trees can be controlled by the phase comparator and a variable delay circuit as shown in FIG. 6, the clock skew in the whole chip can be controlled to the clock skew level in a subordinate clock tree.

Although an H tree clock is shown in this embodiment in which the clock generated by the PLL with an end clock signal from the lower left in the semiconductor chip as a feedback clock is distributed over the entire chip to every circuit element, other clock distribution circuits may be used.

A clock distribution circuit may distribute a clock not over the entire chip to every circuit element, but only a part of the entire semiconductor chip.

The feedback clock signal for the PLL can be not necessarily from the end clock signal of a clock tree but from an arbitrary place of the clock tree.

A variable delay circuit may be provided at one or more points to be able to adjust the delay time of all the end clocks of a subordinate clock tree instead of providing a variable delay circuit for the starting point clock driver of the subordinate clock tree.

Although a variable delay circuit is assumed to be a variable delay circuit with an up-down counter in the present embodiment, any variable delay circuits can be used of an arbitrary type able to adjust an amount of delay of the clock in order to match the phases in a phase comparator by inputting the phase comparison result from the phase comparator, instead of using the variable delay circuit with an up-down counter.

Figure 7:
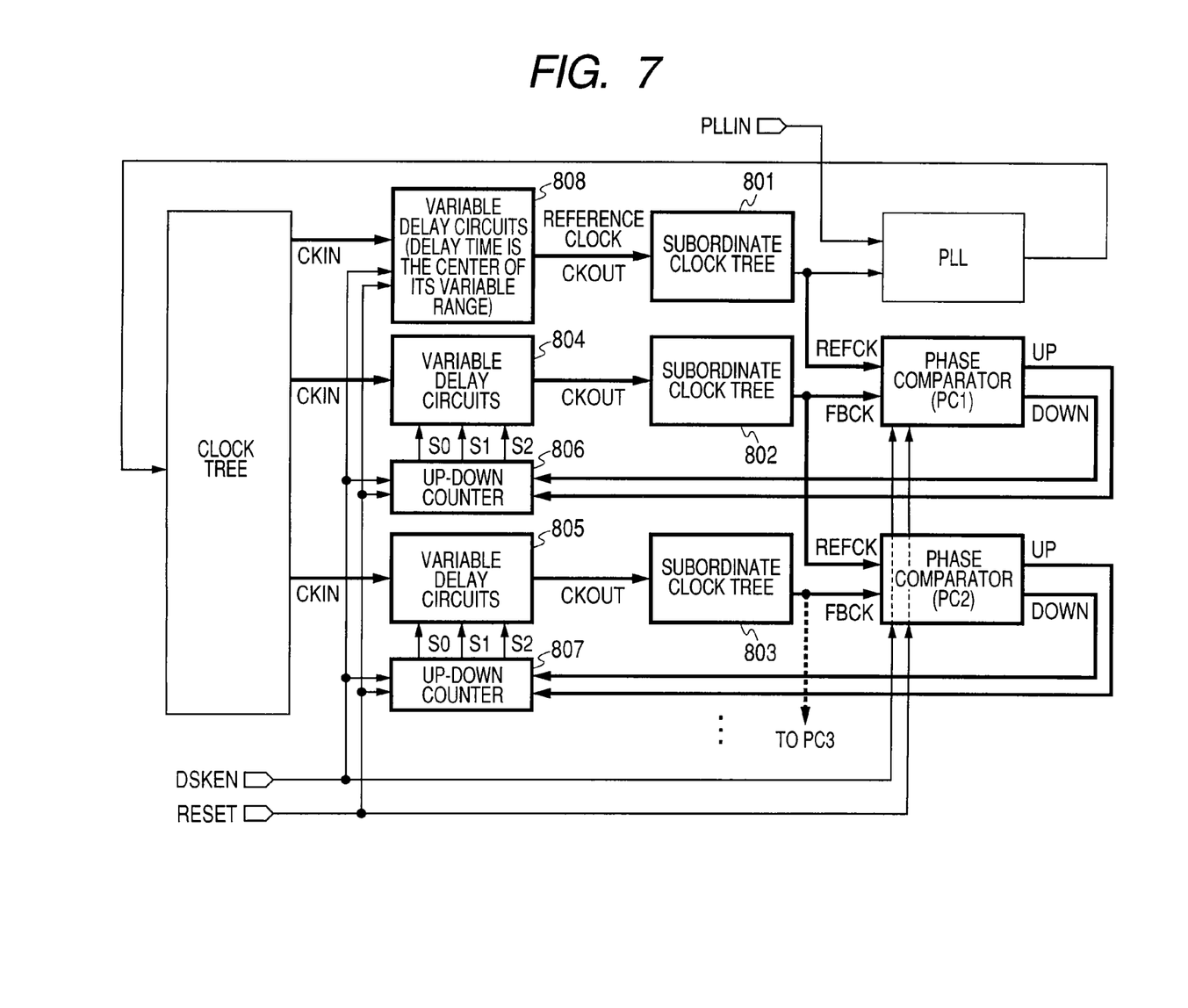
FIG. 7 is a block diagram of the clock skew adjustment circuit in accordance with the first embodiment of the present invention.

FIG. 7 shows a block diagram of the semiconductor integrated circuit of the first embodiment in accordance with the present invention. In this embodiment, a variable delay circuit with an up-down counter is provided for the starting point of each subordinate clock tree. Phase comparators (PC1, PC2) are each provided between adjacent subordinate clock trees. Although the output of a variable delay circuit with an up-down counter is supplied to a flip-flop via each subordinate clock tree, one of the outputs of end clocks is inputted into a phase comparator as a compared clock with the reference clock of an adjacent subordinate clock tree. The phase comparison result in the phase comparator is transmitted to the variable delay circuit with an up-down counter. The variable delay circuit with an up-down counter adjusts the amount of delay to match the phases of two clocks in the phase comparator on the basis of the phase comparison result.

Correspondence between FIG. 7 and FIG. 1 is as follows: the subordinate clock trees 801, 802, and 803 correspond to the subordinate clock tree 150a, the subordinate clock trees 150b, 150f and 150e, and the subordinate clock trees 150c, 150g, 150k and 150j, and 150i, respectively. The variable delay circuits 804, and 805 correspond to those provided in the clock drivers 130b, 130f, and 130e, and in the clock drivers 130c, 130g, 130k, and 130j and 130i, respectively. The variable delay circuit 806 inputted into the subordinate clock tree 801 has the same circuit configuration as that of the variable delay circuits 804 and 805. This variable delay circuit 806 is provided so that delay time difference may not arise between other subordinate clock trees in which the clock CKOUT is inputted via each variable delay circuit. Therefore, the amount of delay is fixed to the center of a variable range and without any control.

A deskew enable signal DSKEN is a control signal for instructing a phase comparator whether to operate and perform a phase adjustment. Phase adjustment is performed when the deskew enable signal DSKEN is H (first state). The manufacturing process of a semiconductor integrated circuit including a phase adjustment is explained in a second embodiment. The semiconductor integrated circuit stores the amount of delay of each up-down counter in a nonvolatile memory (not shown) of the semiconductor integrated circuit. In a power-on-reset sequence of the semiconductor integrated circuit, an amount of delay is read from the nonvolatile memory and written into each up-down counter, and each variable delay circuit delays an inputted clock CKIN by the inputted amount of delay and inputs into a subordinate clock tree. When the deskew enable signal DSKEN is L (second state), phase adjustment is not performed. When the semiconductor integrated circuit does not have a nonvolatile memory, the amount of delay for each up-down counter is stored, for example in an external device, and the semiconductor integrated circuit can be constructed to have a power-on-reset sequence in which the device reads the value of stored amount of delay.

In this case, the phase comparator does not need to operate. Therefore, when the deskew enable signal DSKEN is L, useless power consumption can be cut down by controlling to stop operation of the phase comparator.

Figure 8:
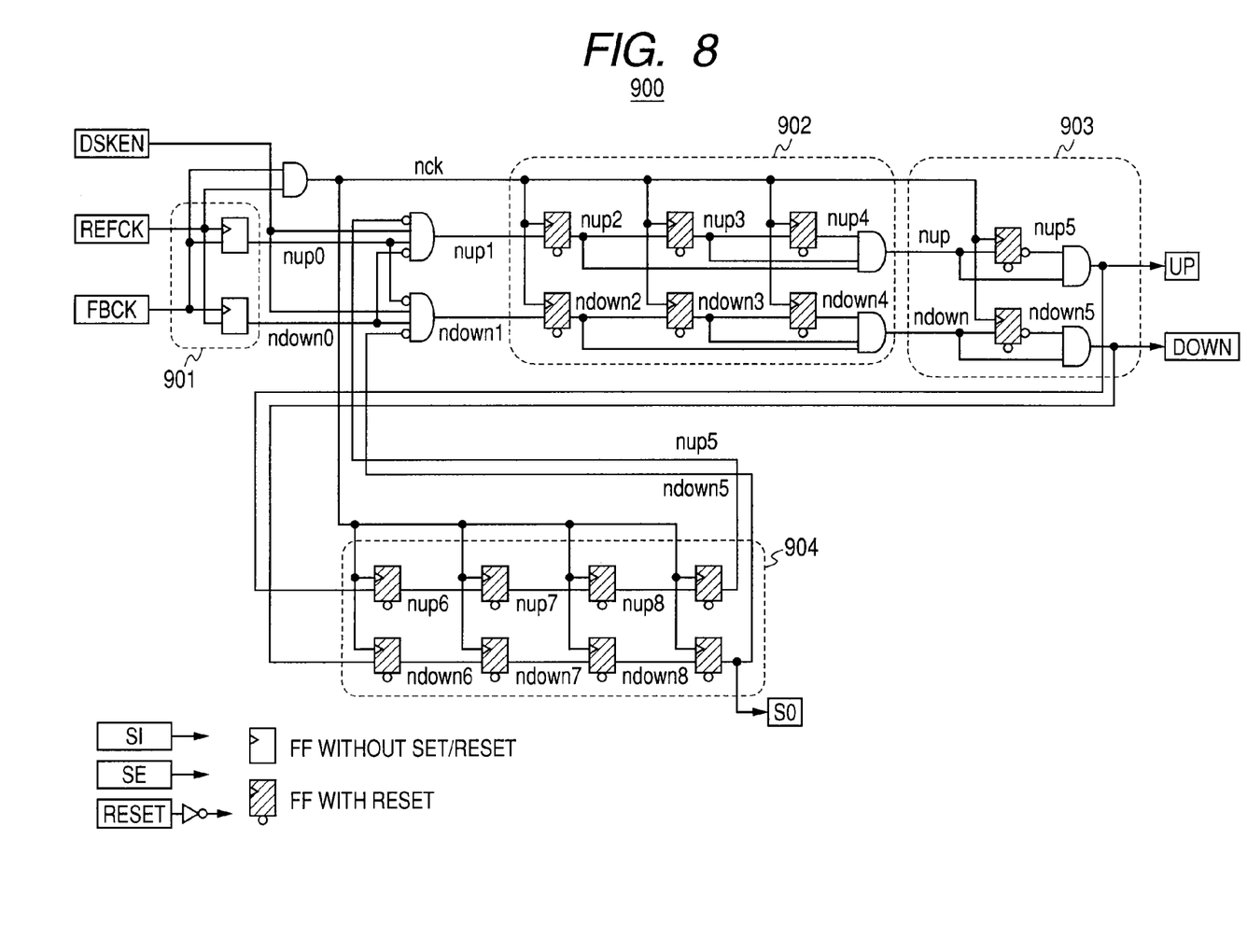
FIG. 8 is a circuit diagram showing an example of the composition of a phase comparator.

The circuit diagram of the phase comparator in the first embodiment is shown in FIG. 8. The phase comparator 900 shown in FIG. 8 includes a phase comparing section 901, a low pass filter 902, a differentiator 903, and a latency adjustment circuit 904. The above configuration is common to all the phase comparators PC1, PC2, and PC3.

When the phases of reference clock REFCK and compared clock FBCK are in agreement, the phase comparing section 901 does not operate, but when a phase shift occurs between the reference clock REFCK and the compared clock FBCK the phase comparing section 901 operates to detect the phase shift. The low pass filter 902 intercepts the detected result of temporary phase shifts arising from such as a noise, and passes only the detected result of a steady phase shift by the phase comparing section 901. The differential circuit 903 generates a counter up signal (UP) pulse or a down signal (DOWN) pulse from the phase comparison result which passed the low pass filter 902. The latency adjustment circuit 904 can hold an UP pulse or a DOWN pulse during a predetermined number of clock cycles, and deter the following UP and DOWN signal generation. By setting this number of clock cycles to be equal to or larger than the number of clock cycles required for a compared clock FBCK to get to the phase comparator again, after an UP pulse or a DOWN pulse is outputted and the phase adjustment is performed with the compared clock FBCK, delay time adjustment at every variable delay time unit by the variable delay circuit and a phase comparison by the phase comparator can be repeated.

In order to clear a history, the flip-flop (FF) with reset is used for the flip-flop used for the low pass filter 902, the differential circuit 903, and the latency adjustment circuit 904.

Figure 9:
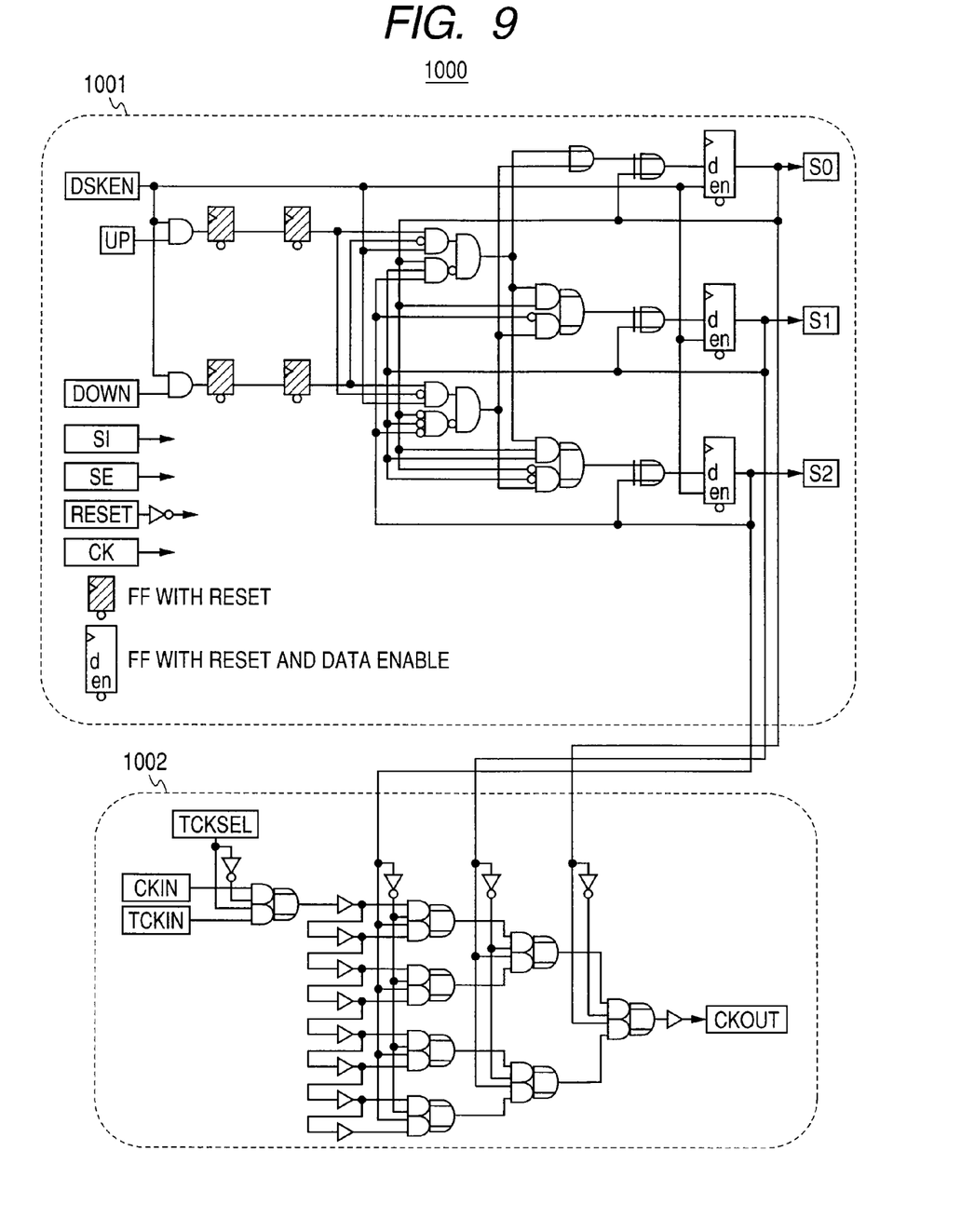
FIG. 9 is a circuit diagram showing an example of the composition of a variable delay circuit.

FIG. 9 shows the circuit diagram of the variable delay circuit with an up-down counter in the first embodiment of the present invention. The variable delay circuit 1000 shown in FIG. 9 includes a 3-bit up-down counter 1001, and a variable delay section 1002. The 3-bit up-down counter 1001 records the present amount of delay of the variable delay section as a counter value, and increases or decreases the counter value following the phase comparison result outputted from the phase comparator. The variable delay section 1002 delays a clock according to a value of the 3-bit up-down counter.

Figure 10:
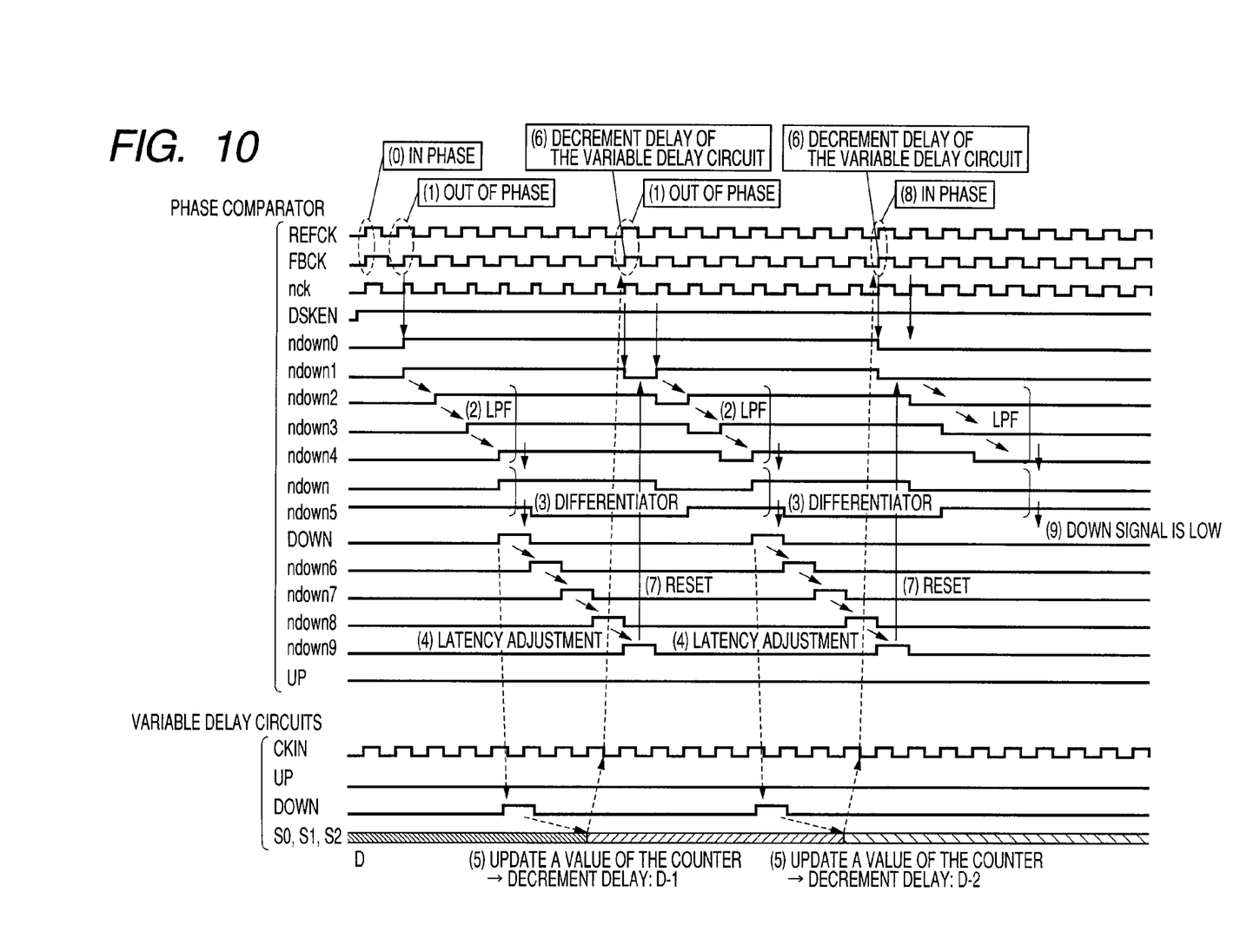
FIG. 10 is a timing chart illustrating the operation of a clock skew adjustment circuit in accordance with the first embodiment of the present invention.

FIG. 10 shows a time chart of an operation for the case where a compared clock becomes late compared to a reference clock in the first embodiment.

Hereafter, the operation and the effect of the embodiment are explained in time order according to the time chart.

(0) When the phases of a reference clock REFCK and a compared clock FBCK are in phase, no more operation taking place.

(1) If a phase shift occurs between the reference clock REFGK and the compared clock FBCK, the phase shift is detected by the phase comparing section 901 of the phase comparator 900.

(2) A temporary phase shift arising from such as a noise is deterred, and only a steady phase shift is detected by using the low pass filter 902 of the phase comparator 900.

(3) A DOWN pulse is generated by the differentiator 903 of the phase comparator 900.

(4) The latency adjustment circuit 904 can hold the signals until the phase of the compared clock FBCK is updated by the UP signal or a DOWN signal, and deters the following UP and DOWN signal generation.

(5) A DOWN signal is inputted into the 3-bit up-down counter 1001 of the variable delay circuit 1000, and the counter value D denoted in 3-bits S0, S1, and S2 is decreased by one.

(6) According to the counter value, the variable delay section 1002 decreases delay of the variable delay section 1002 by unit delay time, and adjusts the phase of compared clock FBCK by one level.

(7) The DOWN signal currently held by the latency adjustment circuit 904 of the phase comparator 900 is reset. When a phase shift between the reference clock REFCK and the compared clock FBCK still remains, a DOWN pulse is generated again by the differentiator 903 and the above-mentioned operation process is repeated.

(8) When the phases of a reference clock REFCK and a compared clock FBCK reach agreement again, a DOWN pulse is not generated even after the DOWN signal is reset by the latency adjustment circuit 904 The two clocks maintain a state in phase with each other by this procedure.

Although a variable delay circuit with a 3-bit up-down counter is used in this embodiment, it is not necessarily required that an up-down counter be a 3-bits and that the counter have an up-down counter, a variable delay with arbitrary circuit structure may be used as long as the amount of clock delay can be adjusted so as to match the phases of both clock signals in a phase comparator by inputting the phase comparison result from the phase comparator.

Although in this embodiment the phase comparator is constituted from a phase comparing section, a low pass filter, a differentiator, and latency adjustment circuit, a phase comparator with arbitrary circuit structure may be used as long as the phase comparator is able to compare the phases of a plurality of inputted clocks and output a phase comparison result in the form that a phase shift, if any, is adjustable by a variable delay circuit.

Figure 11:
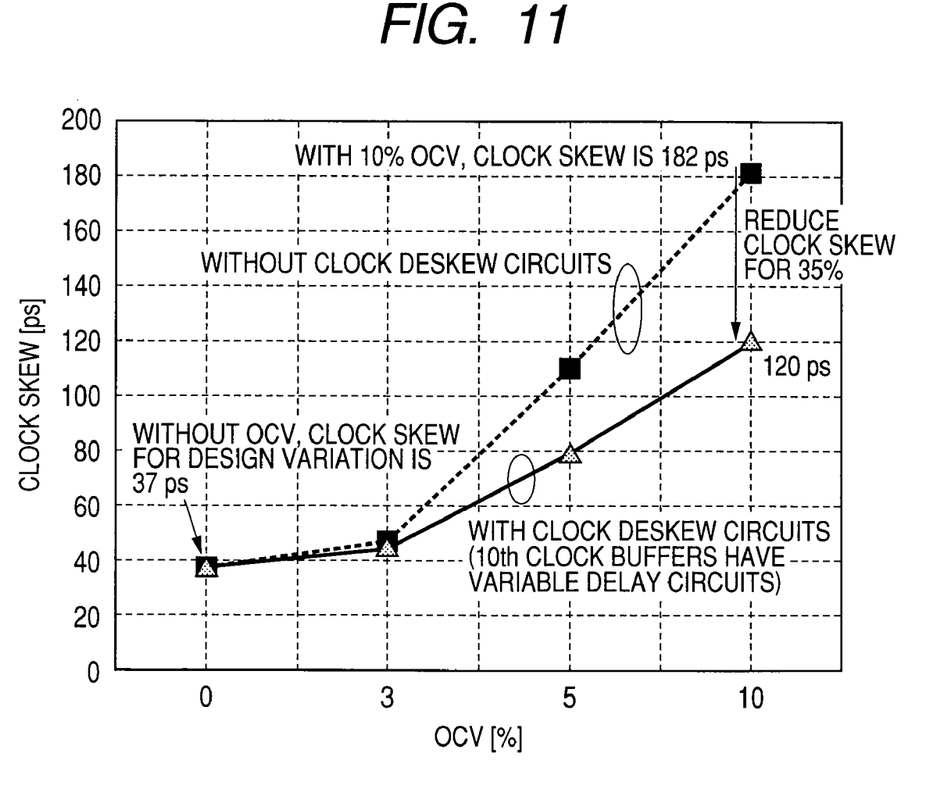
FIG. 11 is a graph which shows the clock skew adjustment effect according to the present invention.

An effect of the present invention is shown in FIG. 11 based on the example of a 90-nm process and an 18-level H-tree clock (2.2 ns of clock delay in a clock tree). Even when there is no OCV (OCV=0%), a clock skew of 37 ps occurs due to design variation. If an OCV of 10% is assumed, when the present invention is not performed, a clock skew is expected to arise by the OCV corresponding to a time delay and a distance between clock buffers for every clock level. If this is integrated over 18 levels, the clock skew reaches 182 ps between the fastest clock and the slowest clock. On the other hand, when the present invention is applied such that a variable delay circuit is added to the 10th level of the clock tree, clock skew of 62 ps arising from the 1-10th levels is adjusted and set to 0 ps, and the clock skew can be reduced to 120 ps which is produced in the remaining 11-18th levels. When the present invention is not applied to a system in which the system operates at 1 GHz (clock period: 1000 ps), and when the present invention is applied to this system the operation frequency is expected to increase up to 1.066 GHz (clock period: 1000−62=938 ps), resulting in an improvement of the operation frequency by 66 MHz.

Second Embodiment

Figure 12:
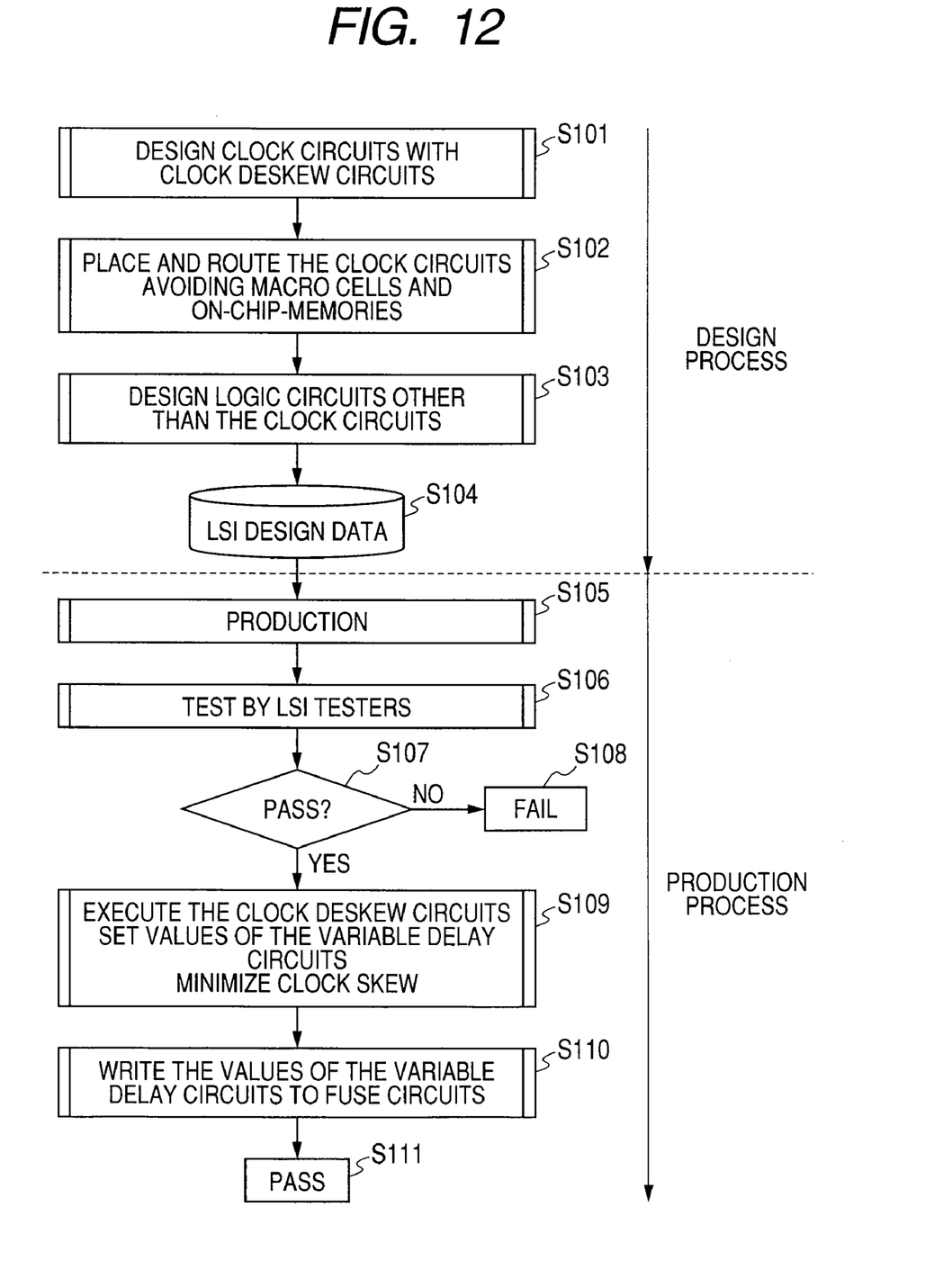
FIG. 12 is a flow chart to show a design and production method of the semiconductor integrated circuit in accordance with the second embodiment of the present invention.

The flow of design and production of the semiconductor integrated circuit in accordance with the present invention is shown in FIG. 12.

(Design Process)

An LSI is designed including a clock distributing circuit having a clock skew adjustment circuit shown in the first embodiment (S101). It is to be noted that elements such as macro cells and on-chip memories may be included by the LSI depending on the LSI to be designed. In this case, a clock distribution circuit is arranged and wired avoiding these elements (S102) Then, logical circuits other than the clocks are designed (8103).

(Production Process)

The LSI is produced based on the design data (S104) of LSI (S105). Sorting is performed by an LSI tester after production, and the judgment on quality either good or poor is performed (S106-S108). A clock skew adjustment circuit is operated, and the amount of delay of a variable delay circuit is set up to compensate the clock skew due to OCV etc., and the clock skew is minimized (S109). Then the amount of delay determined for each variable delay circuit is recorded in a FUSE circuit (nonvolatile memory) (S110).

Figure 13:
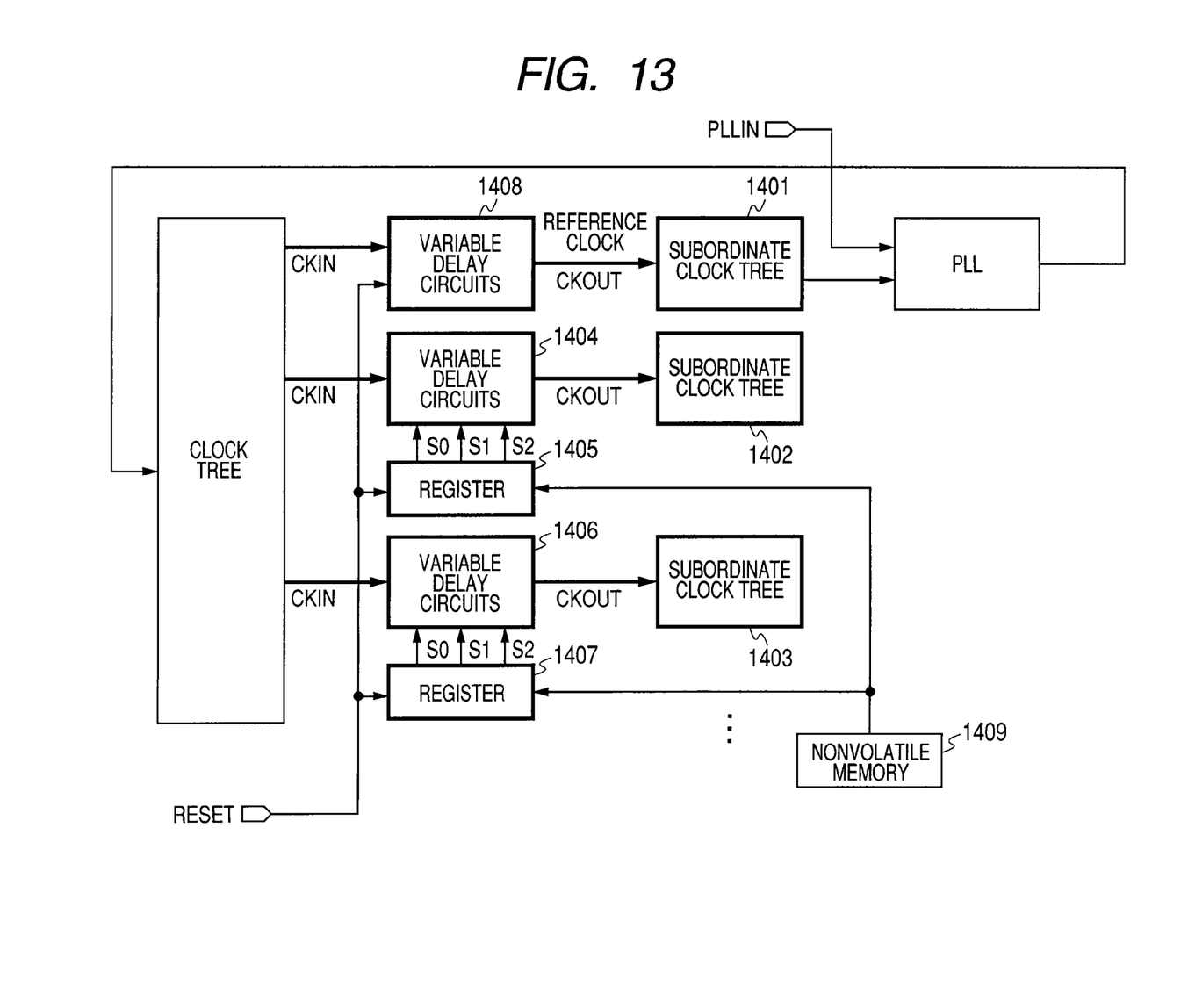
FIG. 13 is another example of composition of a clock skew adjustment circuit.

After LSI production, instead of setting up the amount of delay by operating the clock skew adjustment circuit, the amount of delay of a variable delay circuit may be determined by a simulation calculation etc. in the LSI design level before LSI production. In this case, constituting the semiconductor integrated circuit as shown in FIG. 13 is also possible. As compared with the constitution of FIG. 7, a phase comparator is not required. A predetermined amount of delay is stored in the nonvolatile memory 1409, and stored in each register which specifies the amount of delay of each variable delay circuit. Of course, the amount of delay may be read into each register from an external device instead of the nonvolatile memory 1409.

Instead of recording the amount of delay in the FUSE circuit (nonvolatile memory), the amount of delay once set up for each variable delay circuit as mentioned above may be recorded on an external device. It is also possible not to perform to record the amount of delay, but always to operate the clock skew adjustment circuit, and to continue updating the amount of delay.

What is claimed is:

1. A semiconductor integrated circuit having a clock distribution circuit including a plurality of subordinate clock trees, comprising:

a first subordinate clock tree;

a second subordinate clock tree;

a phase-locked loop for comparing a reference clock and an output clock of a first end clock driver contained in the first subordinate clock tree;

a first phase comparator for comparing an output clock of the first end clock driver with an output clock of a second end clock driver contained in the second subordinate clock tree; and a first variable delay circuit provided for corresponding to the second subordinate clock tree, wherein a clock with a phase adjusted by the phase-locked loop is inputted to the clock distribution circuit, a clock delayed by the first variable delay circuit is inputted to the second sub block tree, an amount of delay of the first variable delay circuit is controlled by the first phase comparator so that a phase of an output clock of the first end clock driver becomes equal to a phase of an output clock of the second end clock driver, and a relative position of the second end clock driver in the end clock driver of the second subordinate clock tree equals to a relative position of the first end clock driver in the end clock driver of the first subordinate clock tree.

2. The semiconductor integrated circuit according to claim 1, further comprising:

a third subordinate clock tree;

a second phase comparator for comparing an output clock of the second end clock driver with an output clock of the third end clock driver contained in the third subordinate clock tree; and a second variable delay circuit provided for corresponding to the third subordinate clock tree, wherein a clock delayed by the second variable delay circuit is inputted to the third subordinate clock tree, and an amount of delay of the second variable delay circuit is controlled by the second phase comparator so that a phase of an output clock of the second end clock driver becomes equal to a phase of an output clock of the third end clock driver, and a relative position of the third end clock driver in the end clock driver of the third subordinate clock tree equals to a relative position of the second end clock driver in the end clock driver of the second subordinate clock tree.

3. The semiconductor integrated circuit according to claim 1, wherein the clock distribution circuit is an H-tree clock distribution circuit.

4. The semiconductor integrated circuit according to claim 3, wherein the clock distribution circuit comprises a plurality of clock driver levels, and the first and the second subordinate clock trees include the same number of clock driver levels.

5. A semiconductor integrated circuit having a clock distribution circuit including a plurality of subordinate clock trees, comprising:

a first subordinate clock tree;

a second subordinate clock tree;

a phase-locked loop for comparing a reference clock and an output clock of a first end clock driver contained in the first subordinate clock tree; and a first delay circuit provided for corresponding to the second subordinate clock tree; wherein a clock with a phase adjusted by the phase-locked loop is inputted to the clock distribution circuit, a clock delayed by a first predetermined amount of delay by the first delay circuit is inputted to the second sub block tree, the first predetermined amount of delay is obtained so that a phase of an output clock of the first end clock driver becomes equal to a phase of an output clock of the second end clock driver contained in the second subordinate clock tree, and a relative position of the second end clock driver in the end clock driver of the second subordinate clock tree equals to a relative position of the first end clock driver in the end clock driver of the first subordinate clock tree.

6. The semiconductor integrated circuit according to claim 5, wherein the first predetermined amount of delay is stored in a nonvolatile memory.

7. The semiconductor integrated circuit according to claim 5, further comprising:

a third subordinate clock tree; and a second delay circuit provided for corresponding to the third subordinate clock tree, wherein a clock delayed by a second predetermined amount of delay by the second delay circuit is inputted to the third sub block tree, the second predetermined amount of delay is obtained so that a phase of an output clock of the second end clock driver becomes equal to a phase of an output clock of the third end clock driver contained in the third subordinate clock tree, and a relative position of the third end clock driver in the end clock driver of the third subordinate clock tree equals to a relative position of the second end clock driver in the end clock driver of the second subordinate clock tree.

8. The semiconductor integrated circuit according to claim 7, wherein the second predetermined amount of delay is stored in a nonvolatile memory.

9. The semiconductor integrated circuit according to claim 5, wherein the clock distribution circuit is an H-tree clock distribution circuit.

10. The semiconductor integrated circuit according to claim 9, wherein the clock distribution circuit comprises a plurality of clock driver levels, and the first and the second subordinate clock trees include the same number of clock driver levels.

11. The semiconductor integrated circuit according to claim 5, further comprising:

a phase comparator for comparing an output clock of the first end clock driver with an output clock of a second end clock driver, wherein the operation of the first phase comparator can be stopped by a control signal.

12. The semiconductor integrated circuit according to claim 7, further comprising:

a phase comparator for comparing an output clock of the second end clock driver with an output clock of the third end clock driver, wherein the operation of the second phase comparator can be stopped by a control signal.

13. A semiconductor integrated circuit having a clock distribution circuit including a plurality of subordinate clock trees, comprising:

a first subordinate clock tree;

a second subordinate clock tree; and a delay circuit provided for corresponding to the second subordinate clock tree, wherein a clock delayed by a predetermined amount of delay by the delay circuit is inputted to the second sub block tree, the predetermined amount of delay is obtained so that a phase of an output clock of the first end clock driver contained in the first subordinate clock tree becomes equal to a phase of an output clock of the second end clock driver contained in the second subordinate clock tree, and a relative position of the second end clock driver in the end clock driver of the second subordinate clock tree equals to a relative position of the first end clock driver in the end clock driver of the first subordinate clock tree.

14. The semiconductor integrated circuit according to claim 13, wherein the predetermined amount of delay is stored in a nonvolatile memory.

15. The semiconductor integrated circuit according to claim 13, wherein the clock distribution circuit is an H-tree clock distribution circuit.

16. The semiconductor integrated circuit according to claim 15, wherein the clock distribution circuit comprises a plurality of clock driver levels, and the first and the second subordinate clock trees include the same number of clock driver levels.

17. The semiconductor integrated circuit according to claim 13, further comprising:

a phase comparator for comparing an output clock of the first end clock driver with an output clock of the second end clock driver, wherein the operation of the phase comparator can be stopped by a control signal.

* * * * *